(12) United States Patent
Reunamaki et al.

(10) Patent No.: US 9,753,562 B2
(45) Date of Patent: Sep. 5, 2017

(54) DYNAMIC THRESHOLD FOR LOCAL CONNECTIVITY SETUP

(71) Applicant: Nokia Technologies Oy, Espoo (FI)

(72) Inventors: Jukka Pekka Reunamaki, Tampere (FI); Arto Tapio Palin, Viiala (FI); Jan Peter Erik Eskolin, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 228 days.

(21) Appl. No.: 14/155,745

(22) Filed: Jan. 15, 2014

(65) Prior Publication Data
US 2015/0199037 A1      Jul. 16, 2015

(51) Int. Cl.
*G06F 3/041* (2006.01)
*G06F 3/0488* (2013.01)
(Continued)

(52) U.S. Cl.
CPC .............. *G06F 3/041* (2013.01); *G06F 3/044* (2013.01); *G06F 3/0416* (2013.01);
(Continued)

(58) Field of Classification Search
CPC ........... H04M 1/7253; H04M 2250/22; H04M 2250/02; H04W 4/026; H04W 4/24;
(Continued)

(56) References Cited

U.S. PATENT DOCUMENTS

| | | |
|---|---|---|
| 6,202,929 B1 | 3/2001 | Verschuur et al. |
| 2004/0203381 A1* | 10/2004 | Cahn et al. ................. 455/41.2 |

(Continued)

FOREIGN PATENT DOCUMENTS

| | | |
|---|---|---|
| EP | 2107771 A1 | 10/2009 |
| EP | 2672764 A1 | 12/2013 |

(Continued)

OTHER PUBLICATIONS

Extended European Search Report received for corresponding European Patent Application No. 14191994.4, dated May 28, 2015, 7 pages.

(Continued)

*Primary Examiner* — Roberto Flores
(74) *Attorney, Agent, or Firm* — Mintz Levin Cohn Ferris Glovsky and Popeo, P.C.

(57) ABSTRACT

Methods and apparatus, including computer program products, are provided for connectivity. In one aspect there is provided a method. The method may include detecting, at a first device including a touch screen sensor and a first short-range transceiver, an object proximate to the touch screen sensor; generating a touch profile representative of the detected object; comparing the generated touch profile to one or more reference touch profiles representative of one or more reference objects corresponding to one or more devices to determine whether the detected object corresponds to at least a second device including a second short-range transceiver; and initiating, by the first device via the first short-range transceiver, a connection establishment to the second device including the second short-range transceiver, when the comparing determines the detected object matches a reference object representative of the second device. Related apparatus, systems, methods, and articles are also described.

20 Claims, 14 Drawing Sheets

(51) Int. Cl.
*G06F 3/044* (2006.01)
*H04W 4/00* (2009.01)
*H04L 29/08* (2006.01)
*H04W 4/02* (2009.01)

(52) U.S. Cl.
CPC ............ *G06F 3/0488* (2013.01); *H04L 67/30* (2013.01); *H04W 4/001* (2013.01); *H04W 4/008* (2013.01); *H04W 4/023* (2013.01); *G06F 2203/04108* (2013.01)

(58) Field of Classification Search
CPC .... H04W 4/008; H04W 8/005; H04B 17/318; H04B 17/27; H04B 5/0012; G06F 3/00; G06F 3/14; G06F 3/1423–3/147; G06F 3/41; G06F 3/044; G06F 3/1454; G09G 5/12; G09G 2356/00
USPC .......................................... 345/156, 173, 178
See application file for complete search history.

(56) References Cited

U.S. PATENT DOCUMENTS

| | | | |
|---|---|---|---|
| 2007/0124503 A1* | 5/2007 | Ramos et al. ................. | 709/248 |
| 2009/0058829 A1* | 3/2009 | Kim .......................... | G06F 3/016 345/173 |
| 2009/0215397 A1* | 8/2009 | Thorn et al. .................. | 455/41.2 |
| 2010/0144274 A1* | 6/2010 | Mcdowall et al. ........... | 455/41.2 |
| 2011/0001726 A1 | 1/2011 | Buckingham et al. | |
| 2011/0070828 A1* | 3/2011 | Griffin ................. | H04M 1/7253 455/41.1 |
| 2011/0070829 A1* | 3/2011 | Griffin ..................... | H04B 5/02 455/41.1 |
| 2011/0115606 A1 | 5/2011 | Fu et al. | |
| 2011/0118026 A1 | 5/2011 | Lukas et al. | |
| 2011/0140864 A1 | 6/2011 | Bucci | |
| 2012/0015605 A1 | 1/2012 | Sole | |
| 2012/0040719 A1* | 2/2012 | Lee et al. ....................... | 455/557 |
| 2012/0051244 A1* | 3/2012 | Nagara .......................... | 370/252 |
| 2012/0109455 A1* | 5/2012 | Newman ............. | G06F 3/03547 701/36 |
| 2012/0289157 A1 | 11/2012 | Palin et al. | |
| 2012/0289158 A1* | 11/2012 | Palin et al. .................. | 455/41.2 |
| 2012/0289159 A1* | 11/2012 | Palin et al. .................. | 455/41.2 |
| 2012/0289160 A1* | 11/2012 | Palin et al. .................. | 455/41.2 |
| 2012/0327041 A1* | 12/2012 | Harley et al. ................. | 345/179 |
| 2013/0076614 A1 | 3/2013 | Ive et al. | |
| 2013/0176252 A1* | 7/2013 | Frojdh ..................... | G06F 3/033 345/173 |
| 2013/0278540 A1 | 10/2013 | Yilmaz | |
| 2013/0281025 A1 | 10/2013 | Reunamaki et al. | |
| 2013/0285797 A1* | 10/2013 | Paulsen .............. | G06K 7/10207 340/10.5 |
| 2013/0331031 A1* | 12/2013 | Palin ................. | H04W 52/0245 455/41.2 |
| 2014/0019913 A1* | 1/2014 | Newman ............... | G06F 3/0488 715/810 |
| 2014/0087654 A1* | 3/2014 | Kiveisha et al. ............ | 455/41.1 |
| 2014/0152425 A1* | 6/2014 | Valentine .................. | G06F 3/00 340/10.51 |
| 2014/0194062 A1* | 7/2014 | Palin ..................... | H04W 4/008 455/41.2 |
| 2014/0206286 A1* | 7/2014 | Palin ..................... | H04W 8/005 455/41.2 |
| 2014/0324938 A1* | 10/2014 | Gardenfors et al. .......... | 709/201 |
| 2014/0340347 A1* | 11/2014 | Tenuta .................. | G06F 3/0416 345/174 |
| 2014/0355517 A1* | 12/2014 | Reunamaki ........... | H04W 8/005 370/328 |
| 2015/0002371 A1* | 1/2015 | Burgess et al. ................ | 345/1.2 |
| 2015/0147963 A1* | 5/2015 | Harada ............. | H04W 52/0245 455/41.1 |
| 2015/0155916 A1* | 6/2015 | Kuo ........................ | G06F 3/041 455/41.1 |
| 2015/0163338 A1 | 6/2015 | Salo | |
| 2015/0189461 A1* | 7/2015 | Pang ..................... | H04W 4/008 455/41.1 |
| 2015/0199037 A1 | 7/2015 | Reunamaki et al. | |
| 2015/0199941 A1* | 7/2015 | Reunamaki ........... | G06F 3/0416 345/174 |

FOREIGN PATENT DOCUMENTS

| | | |
|---|---|---|
| WO | 2012/140772 A1 | 10/2012 |
| WO | 2013/057368 A1 | 4/2013 |

OTHER PUBLICATIONS

Non-Final Office action received for corresponding U.S. Appl. No. 14/155,798, dated Jun. 1, 2015, 15 pages.
"Samsung Galaxy S 4 Display, Air View and Air Gesture Demoed on Video", Phonearena, Retrieved on Mar. 14, 2014, Webpage available at : http://www.phonearena.com/news/Samsung-Galaxy-S-4-display-Air-View-and-Air-Gesture-demoed-on-video__id40881.
"Xperia Sola", Sonymobile, Retrieved on Mar. 14, 2014, Webpage available at : http://www.sonymobile.com/global-en/products/phones/xperia-sola/#black.
"Floating Touch", Developer World, Retrieved on Mar. 14, 2014, Webpage available at : http://developer.sonymobile.com/knowledge-base/technologies/floating-touch/.
"Specification of the Bluetooth System", Bluetooth Specification v4.0, Jun. 30, 2010, 2302 pages.
Barker, "How to Use Bluetooth on your Nokia Asha Touch", Nokia Conversations, Retrieved on Mar. 14, 2014, Webpage available at : http://conversations.nokia.com/2013/07/02/how-to-use-bluetooth-on-your-nokia-asha-touch/.
"Toys Digitally Come to Life on iPad", AppMates, Retrieved on Apr. 2, 2014, Webpage available at : http://www.appmatestoys.com/.
"iMarker by Griffin Technology with Crayola Colorstudio HD", 148 apps, Retrieved on Apr. 1, 2014, Webpage available at : http://www.148apps.com/reviews/imarker-griffin-technology-crayola-colorstudio-hd/.

* cited by examiner

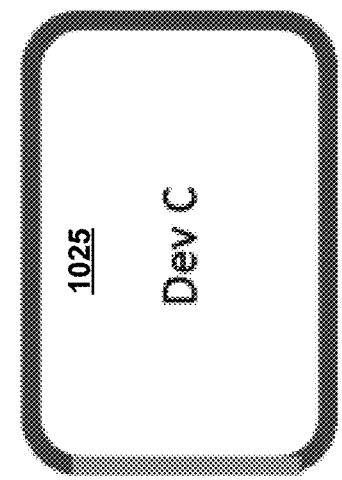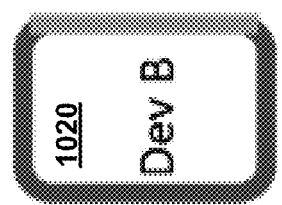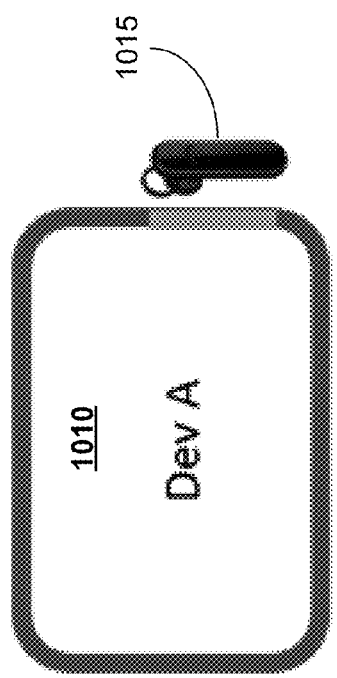
FIG. 10

DYNAMIC THRESHOLD FOR LOCAL CONNECTIVITY SETUP

FIELD

The subject matter described herein relates to wireless devices.

BACKGROUND

Three-dimensional (3D) touch may refer to allowing interaction with a device having a touch-sensitive screen, without actually having to make contact with the device. For example, a 3D touch sensor may detect one or more objects proximate to (for example, hovering above or adjacent to) the device without an object necessarily making contact with the touch sensor. The 3D touch may enable the device to register objects, such as a cursor, a finger, and any other object, up to about for example several centimeters above the touch sensor. The 3D touch sensor may also be configured to detect a location of the object proximate to or touching the touch screen, a direction of the object, location of object at the edges of the device and the like. As such, screen coordinates being touched or pointed to may be detected as well as off-screen locations/points, an object's distance from the touch screen, and other properties of the object.

SUMMARY

Methods and apparatus, including computer program products, are provided for connectivity.

In some example embodiments, there is provided a method. The method may include detecting, at a first device including a touch screen sensor and a first short-range transceiver, an object proximate to the touch screen sensor; generating a touch profile representative of the detected object; comparing the generated touch profile to one or more reference touch profiles representative of one or more reference objects corresponding to one or more devices to determine whether the detected object corresponds to at least a second device including a second short-range transceiver; and initiating, by the first device via the first short-range transceiver, a connection establishment to the second device including the second short-range transceiver, when the comparing determines the detected object matches a reference object representative of the second device.

In some variations, one or more of the features disclosed herein including the following features can optionally be included in any feasible combination. The touch screen sensor may include a capacitive touch screen sensor. The first and second short-range transceivers may each include a transceiver configured in accordance with at least one of Bluetooth, Bluetooth Low Energy, and ZigBee. The detecting may further include determining at least one of a position and an orientation of the detected object proximate to the touch screen sensor. A received signal strength threshold value may be adjusted based on the determining and configured to detect, during the connection establishment, one or more devices including the second device. The first device may send via the first short-range transceiver one or more inquiry messages to one or more devices including the second device. The detected object may make contact with the touch screen sensor. The first device may send one or more messages to one or more peer devices, the one or more messages including information regarding the detected object. The initiating the connection establishment may further include sending, by the first device via the first short-range transceiver, one or more page messages to one or more devices including the second device.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings,

FIG. 10 depicts an example of a system in which at least one device communicates or advertises proximate devices, in accordance with some example embodiments;

Figure 1:
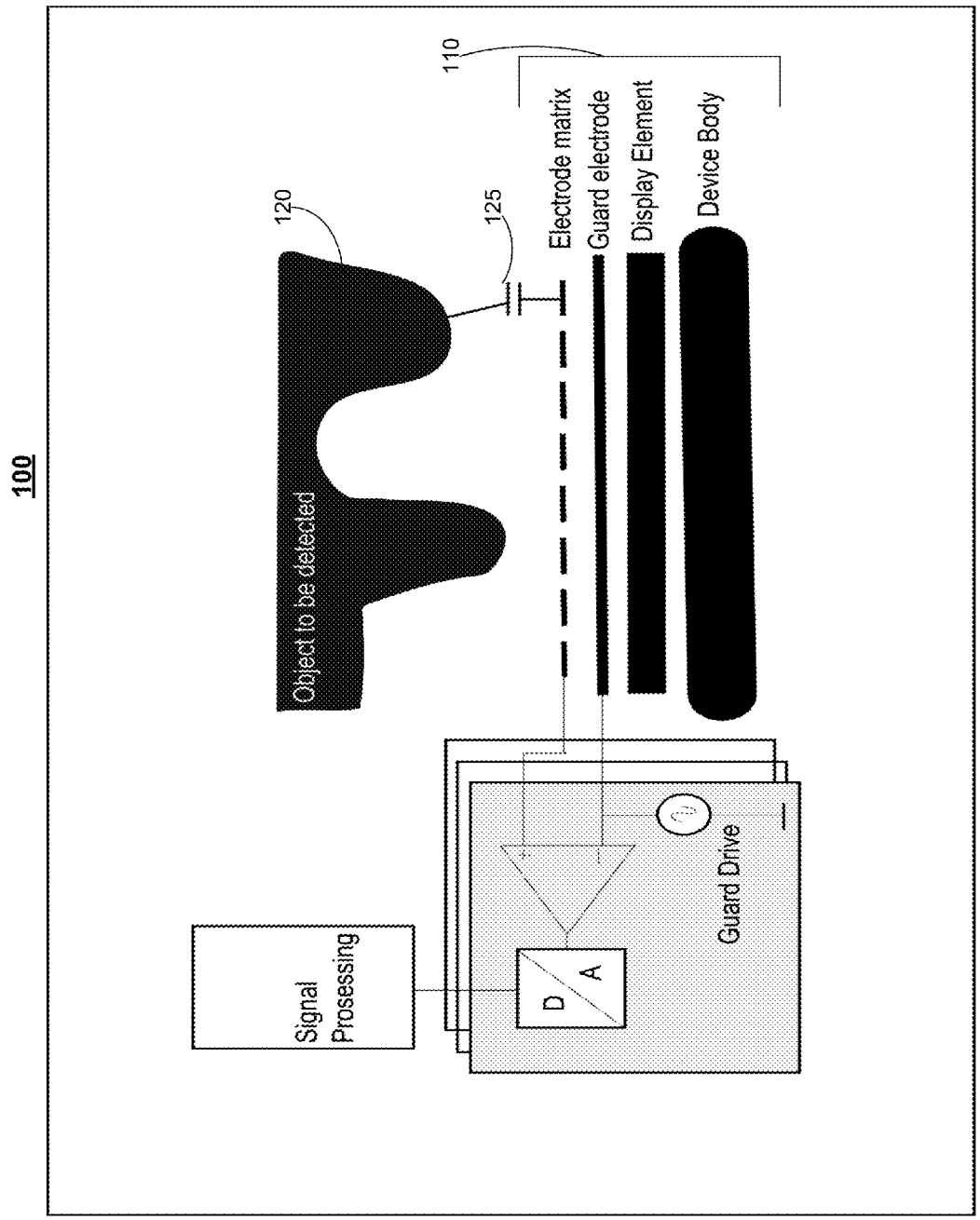
FIG. 1 depicts an example of a 3D touch sensor which may be used, in accordance with some example embodiments.

Like labels are used to refer to same or similar items in the drawings.

DETAILED DESCRIPTION

Some 3D touch detection sensors may use capacitive touch technology. When this is the case, a measurement of an object's (for example, a human body) capacitance to ground may be performed. FIG. 1 depicts an example of a 3D touch sensor 110 and an object 120, such as a finger. FIG. 1 also depicts the capacitance, C 125, representative of a measure of the human body capacitance to ground, which as noted may be measured in a variety of ways (for example, based on time to reach a certain charge and the like). Moreover, FIG. 1 depicts the various layers at 110, which may be included in the touch sensor. Generally, the 3D touch sensor 110 may operate by scanning the sensor for touches or proximate touches (for example, hovering or pointing above but not making contact with the surface of the touch sensor). When the touch/proximate touch is detected by 3D touch sensor 110, sensor data, such as an identifier for the touch/proximate touch, coordinates of the touch, curvature, direction, pointedness, and other information related to the touch, may be provided to a processor for further processing.

Figure 2:
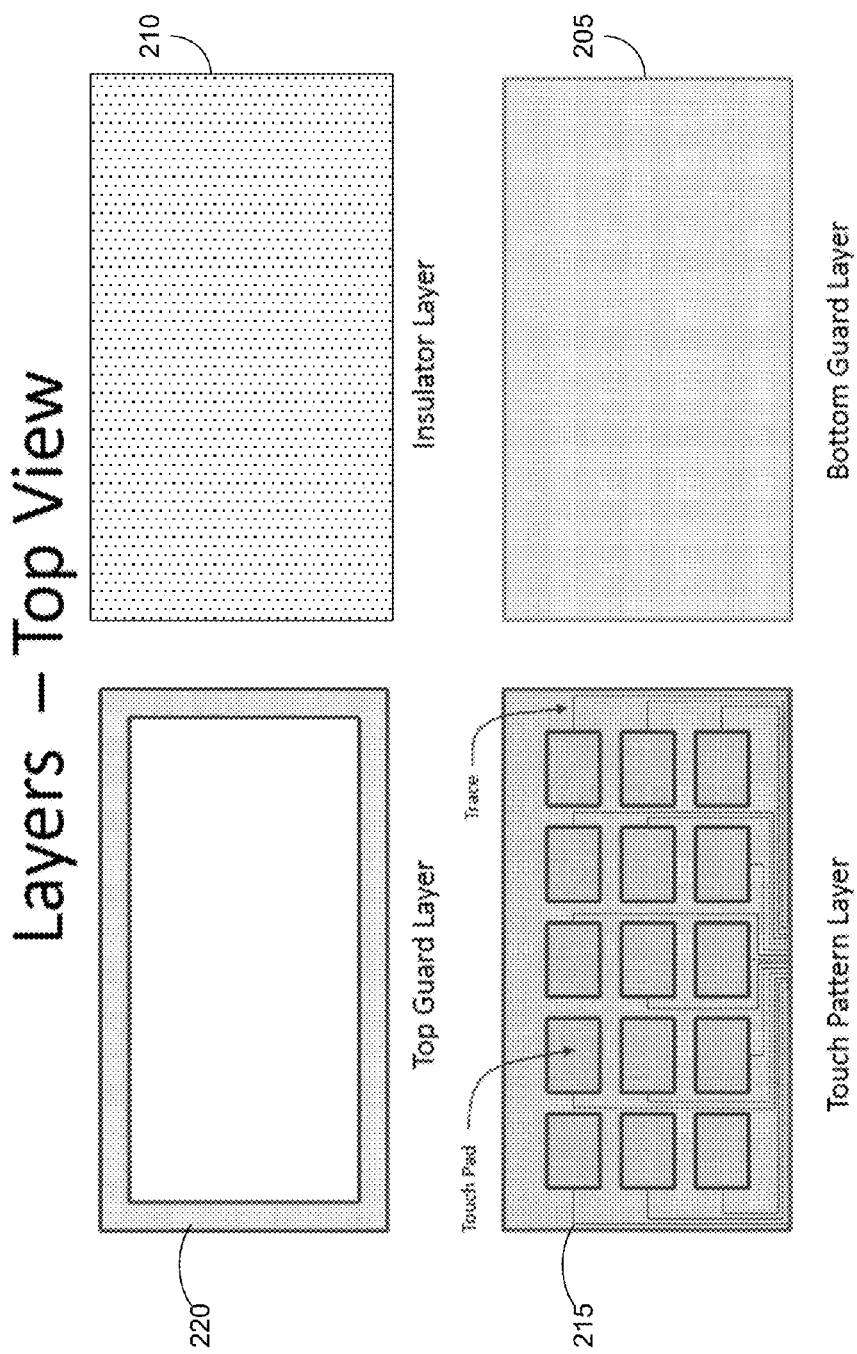
FIG. 2 depicts an example of the layers of in the 3D touch sensor depicted at FIG. 1.

FIG. 2 depicts an implementation of the various layers of the 3D touch sensor 110. The bottom guard layer 205 may be used to enable the elimination of noise from the other components. On top of the bottom guard layer 205, there may be an insulator layer 210 to prevent conductivity between layers. Next, a 3D capacitive touch pattern layer 215 may be placed. This capacitive touch pattern layer 215 may include a matrix pattern of transparent square shape electrodes. These electrodes may be used as one side of the capacitor plates, and an oscillator frequency may be driven to each pattern in the matrix to detect touches, proximate touches, and the like. Lastly, a guard layer 220 may be placed on the touch pattern layer 215.

Figure 3:
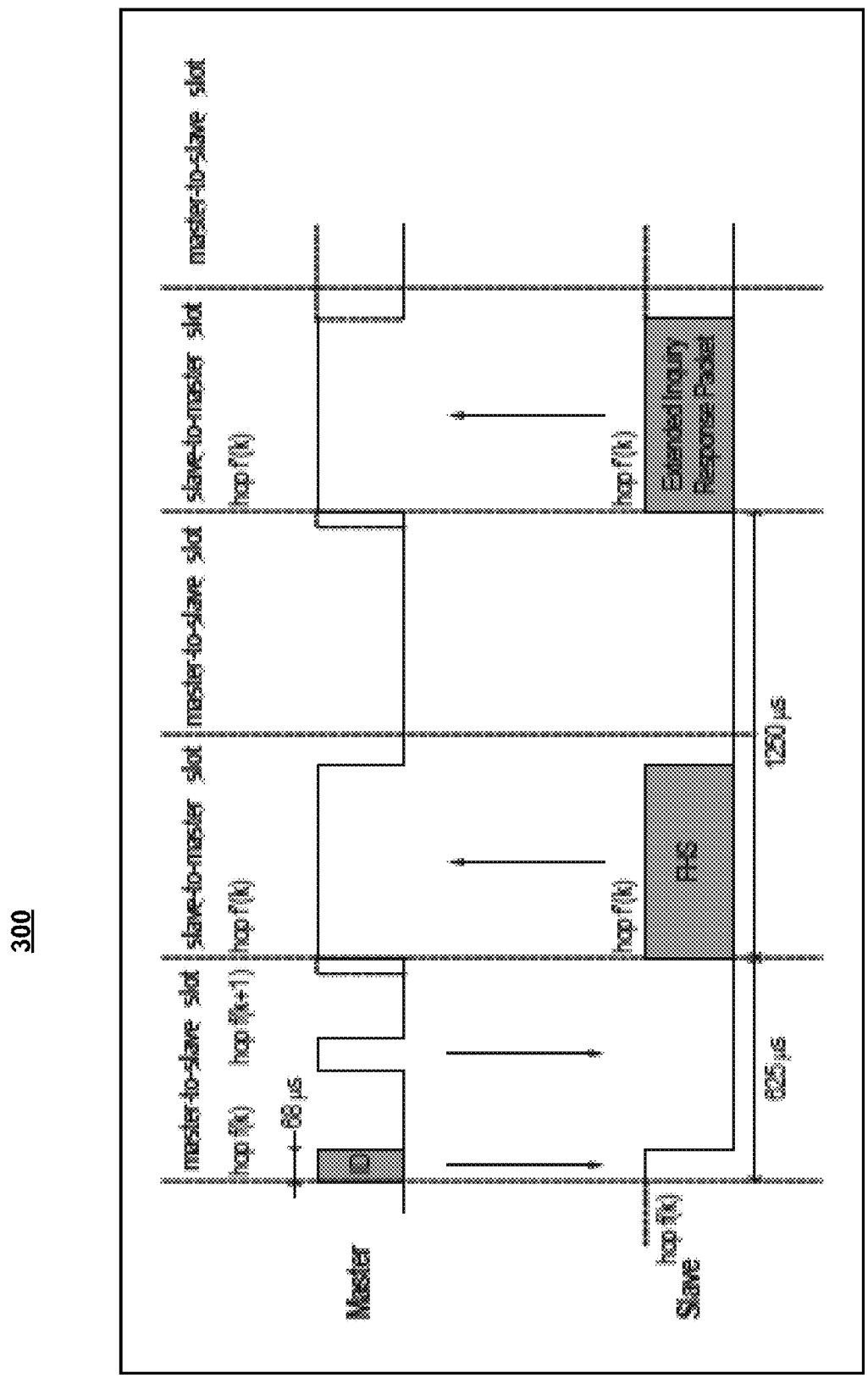
FIG. 3 depicts an example of a Bluetooth inquiry process used to discover devices.

Bluetooth devices may perform a discovery, selection, and connection setup among Bluetooth devices. However, this discovery, selection, and connection may be a relatively complex process for a user to perform. In the case of Bluetooth, a discoverable device may perform an inquiry scan to listen for inquiries from other devices. FIG. 3 depicts an example of the timing of the Bluetooth inquiry process 300. Referring to FIG. 3, a device (for example, "Master") may send inquiry packets (for example, ID packets) and the discoverable device (for example "Slave") may perform inquiry scans to determine whether there are inquiry packets. If so, the discoverable device may respond to the inquiry packets with for example Frequency Hopping Synchronization (FHS) packets. Moreover, the discoverable device may send an Extended Inquiry Response (EIR) packet after the FHS packet to deliver more information about the discoverable device. The EIR packet may include for example the name of the discoverable device, transmit power, and other information.

In order to collect responses from all discoverable devices (or slaves) in range, an inquiry sub-state at an inquiring device (which is discovering for discoverable devices) may last about 10.24 seconds unless the inquiring device collects sufficient responses to abort the inquiry sub-state early. If desired, the inquiring device may also prolong the inquiry sub-state to increase the probability of receiving all responses from discoverable devices (which may be necessary in an error-prone environment).

To simplify the discovery, selection, and connection setup process among Bluetooth devices, a touch-to-select (T2S) process may be used to reduce the complexity of this process. Specifically, the T2S process may allow a first Bluetooth device to touch (for example, make contact with, or be proximate to) a second Bluetooth device and/or a touch screen sensor of the second Bluetooth device in order to initiate the discovery, selection, and connection setup process. As part of this process, the T2S process may utilize a discovery operation to discover one or more nearby devices and detect signal strength, such as a received signal strength indicator (RSSI), to determine when a device is touching or nearby. Given that the first device has made contact with the touch screen of a second device, the second device may be able to more rapidly discover and subsequently establish a connection to the first device. For example, the first device making contact or nearby may send messages, which may be received at the second device with greater signal strength and/or at a greater frequency/speed, when compared to a more distant device.

However, relying on signal strength/RSSI may require a sufficiently high signal strength margin due to the varied types of devices and the varied kinds of situations, in which a device may be used. For example, different devices may have different antenna patterns which radiate energy differently, varied antenna placement, objects (for example, a hand and the like) covering/blocking/shielding the antenna, and the like.

When discovering devices and establishing connections via Bluetooth based on signal strength, a threshold level/value of signal strength (for example, RSSI) may need to be set, so that discoverable devices that are not in close proximity are not discovered while discoverable devices that are in close proximity are discovered. However, signal strength may attenuate steeply even in close proximity, and varies greatly based on a variety of factors as noted above.

Figure 4:
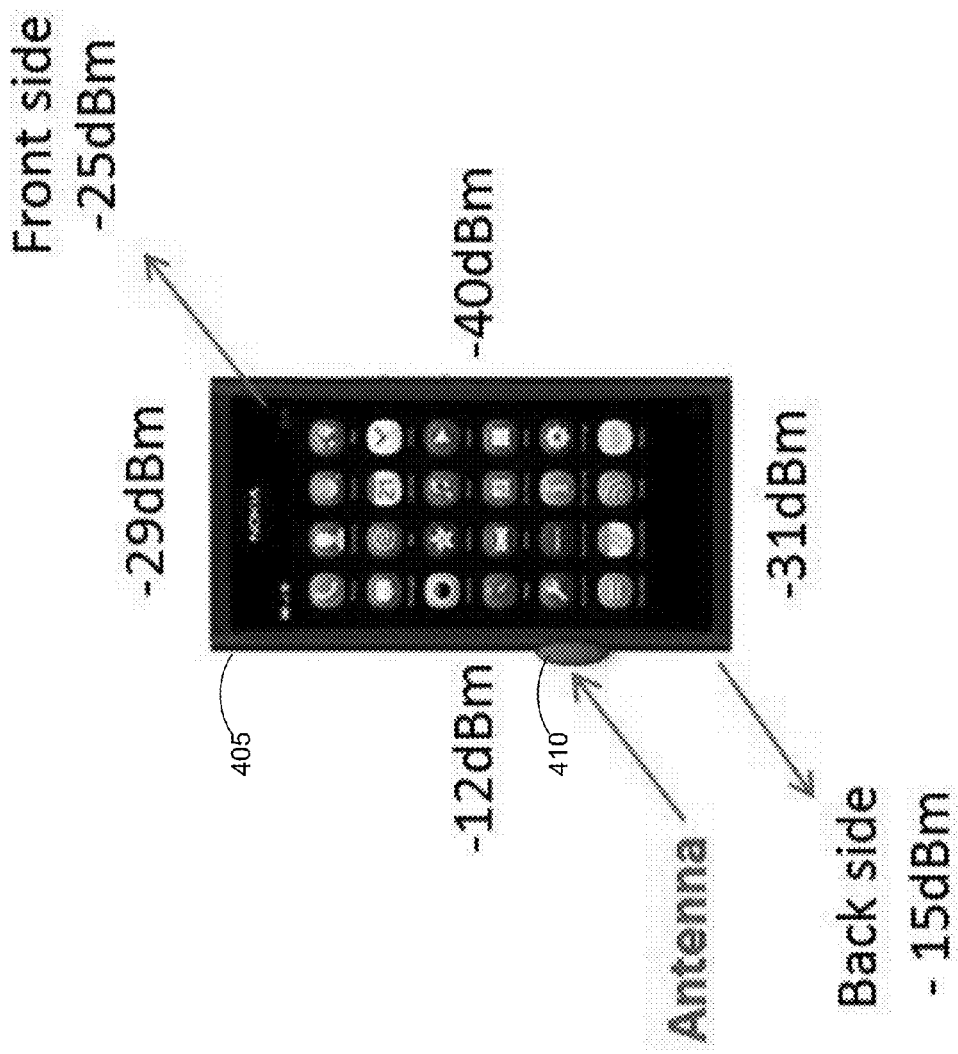
FIG. 4 depicts an example of the variance in the field strength around the periphery of a radio.

FIG. 4 depicts an example of a device 405 having a Bluetooth transceiver and an antenna located at 410. In the example of FIG. 4, the Bluetooth field strength in the immediate vicinity of device 405 is shown. As can be seen, the signal strength may vary from −12 dBm (power ratio in decibels (dB) of the measured power referenced to one milliwatt) near the antenna 410 to −40 dBm on the opposite side of the antenna. Given this variance in signal strength as well as other factors that impact the Bluetooth signal strength as noted, using a single signal strength threshold value for discovery of Bluetooth devices may be problematic in some implementations, leading to either an unnecessarily low threshold (which may discover distant Bluetooth devices that are not in the vicinity of the inquiring device) or an unnecessarily high threshold (which may not detect a nearby discoverable device).

Although some of the description and examples described herein refer to devices having Bluetooth transceivers, other short-range radio technologies may be used as well including Bluetooth Low Energy, ZigBee, ANT, NFC (near field communications), Wi-Fi, and any other short-range radio technology.

In some example embodiments, a first Bluetooth device, such as a Bluetooth headset or any other device having a Bluetooth transceiver, may be detected using for example, a touch panel sensor (for example, a 3D touch sensor) at a second Bluetooth device. The detected first Bluetooth device may be at least proximate to (for example, hover over) the touch panel sensor of the second Bluetooth device. When this is the case, the second Bluetooth device having the touch panel sensor may detect the proximate first Bluetooth device, initiate an inquiry process to discover proximate devices including the first Bluetooth device, and/or indicate that a connectable device, such as the first Bluetooth device, is in the vicinity of the second Bluetooth device.

In some example embodiments, a first Bluetooth device, such as a Bluetooth headset or any other device having a Bluetooth transceiver, may be detected using for example, a touch panel sensor (for example, a 3D touch sensor) at a second Bluetooth device. The detected first Bluetooth device may be at least proximate to (for example, hover over) the touch panel sensor of the second Bluetooth device. When this is the case, the second Bluetooth device having the touch panel sensor may detect the proximate first Bluetooth device and initiate a page process to connect the first Bluetooth device if the first Bluetooth device is identified and parameter(s) required to make connection request are known. In case there are multiple possible devices to connect to, the second device may try to page some (if not all) probable devices and connect to at least the most suitable one.

Figure 5:
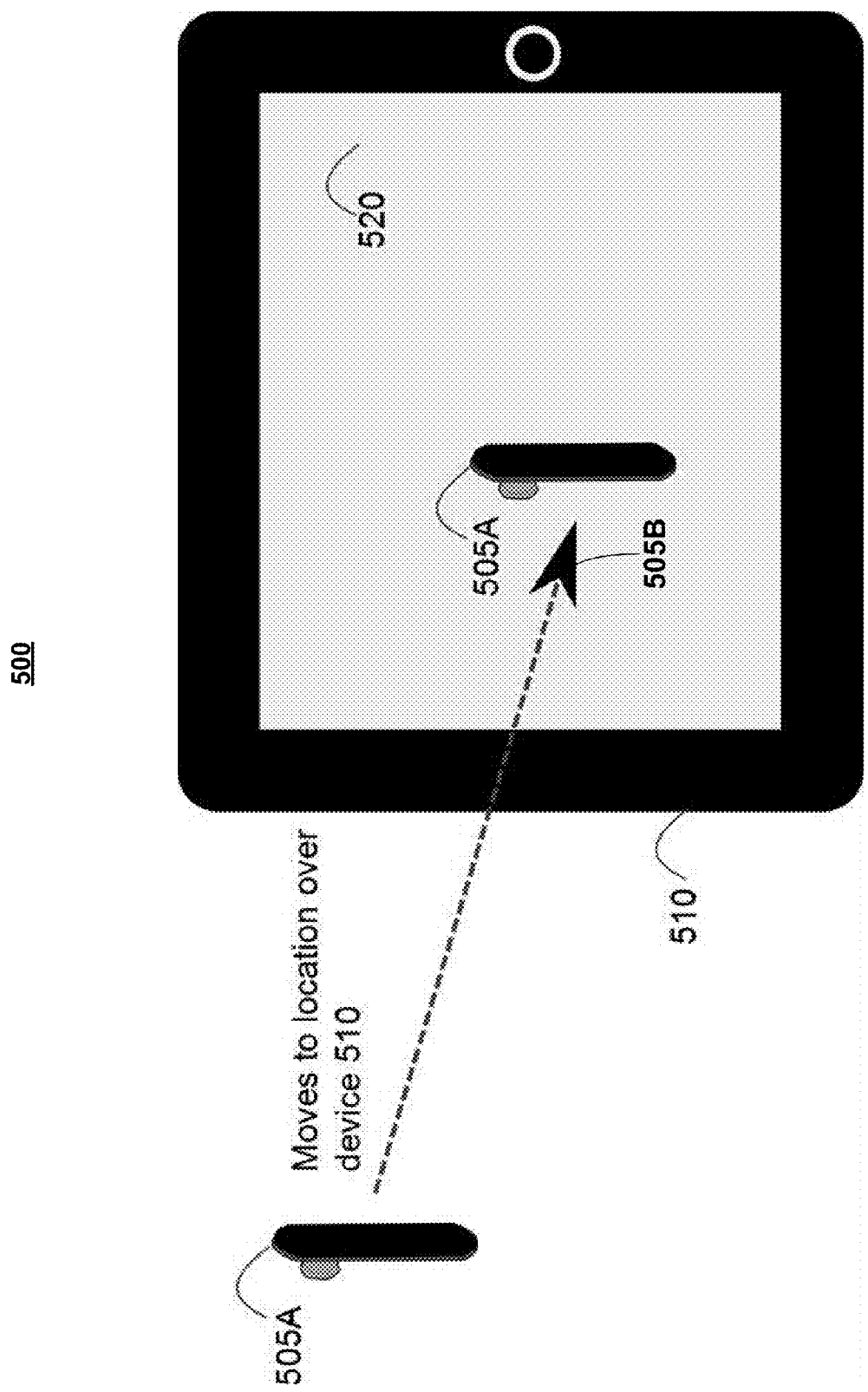
FIG. 5 depicts an example of a system including a Bluetooth headset and a second Bluetooth device having a touch screen, in accordance with some example embodiments.

FIG. 5 depicts an example system 500 including a first Bluetooth device, such as Bluetooth headset 505A, and a second Bluetooth device 510 having a touch screen 520, in accordance with some example embodiments. When Bluetooth headset 505A is moved to the location at 505B, Bluetooth headset 505A may be proximate to (for example, above) a touch screen 520 of the second Bluetooth device 510, although the headset 505A may make contact with screen 520 as well. Touch screen 520 may then detect that Bluetooth headset 505A has been placed above the touch screen 520. When Bluetooth headset 505A is detected, second Bluetooth device may initiate one or more operations, such as a Bluetooth inquiry search for nearby devices including the Bluetooth headset 505A. If Bluetooth headset 505A is found, then a Bluetooth connection establishment process may proceed between Bluetooth headset 505A and Bluetooth device 510. This connection may be established automatically or with an indication of approval from for example a user.

In some example embodiments, second Bluetooth device 510 may be able to distinguish between certain objects. For example, second Bluetooth device 510 may compare the raw data (for example, a fingerprint or profile representative of the device 510) generated by touch screen sensor 520 to one or more reference fingerprints to determine whether the second Bluetooth device 510 is a finger, a stylus, a Bluetooth headset, or other object. If the comparison results in a match, then certain operations may proceed at the second Bluetooth device 510. For example, if the match identifies the object hovering over the touch screen sensor 520 is Bluetooth headset 505A, then second Bluetooth device 510 may perform predetermined operations, such as initiate an inquiry and/or proceed with connection establishment via Bluetooth to Bluetooth headset 505A. However, if the match identifies the object hovering over the touch screen sensor 520 is an object such as a finger, the second Bluetooth device 510 may perform other types of operations as an inquiry and connection establishment to the finger may not be appropriate.

In some example embodiments, second Bluetooth device 510 may have one or more reference fingerprints stored to enable comparison to devices detected by the touch screen sensor 520. In some example embodiments, the stored reference fingerprints may be provided to the second Bluetooth device 510 to enable a comparison that allows determining the type of object. Additionally or alternatively, the stored reference fingerprints may be learned by the second Bluetooth device 510 to enable a comparison that allows determining the type of object. For example, if an object is initially detected by the touch screen sensor 520 and a match is not found, second Bluetooth device 510 may subsequently learn the device type (for example, automatically or via a user interface page where information regarding the device is provided).

Figure 6:
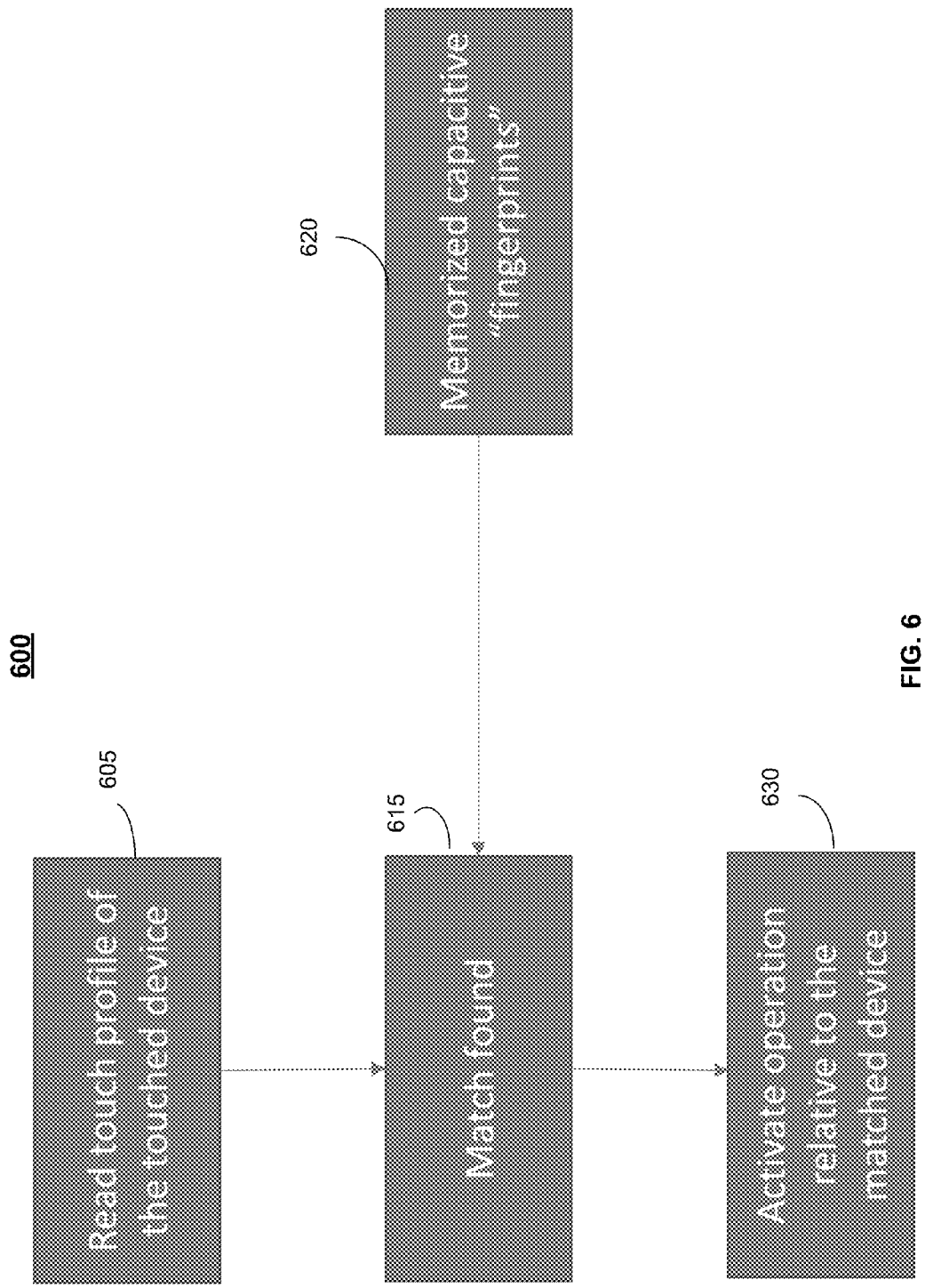
FIG. 6 depicts an example of a process for detecting devices via a touch screen sensor and proceeding with one or more corresponding operations, in accordance with some example embodiments.

FIG. 6 depicts an example process 600 for detecting devices via a touch screen sensor and then proceeding with one or more operations including device discovery based on the detection, in accordance with some example embodiments. The description of process 600 also refers to FIG. 5.

At 605, the second Bluetooth device 510 having the touch screen sensor 520 may receive (or read) raw sensor data, in accordance with some example embodiments. For example, second Bluetooth device 510 may receive from the touch screen sensor 520 a touch profile or a fingerprint including an identifier for the touch (including a proximate touch), coordinates on the touch screen sensor 520 for the touch, and other data (for example, angles, curvature, direction, pointedness, and the like), when an object touches, or is proximate to, touch screen sensor 520.

At 615, second Bluetooth device 510 may determine whether the received touch profile (or fingerprint) of the device touching, or proximate to, touch screen sensor 520 matches one or more touch profiles/fingerprints stored at 620. The fingerprint may represent the shape (for example, general coordinates of the shape) of the object, such as device 505A, as detected by the capacitive sensor of touch screen 520. The second Bluetooth device 510 may compare the touch profile/finger print received at 605 (which in this example corresponds to a fingerprint of a Bluetooth headset 505A) to one or more reference touch profiles/fingerprints stored in a database 620 or other storage or memory mechanism.

To illustrate further, the one or more reference touch profiles stored at 620 may correspond to different objects, such as a finger, a Bluetooth headset, a music player, a phone, and any other object. If the comparison between the fingerprint of a Bluetooth headset 505A and the stored one or more objects results in a match, then second Bluetooth device 510 may determine that the received data at 605 likely corresponds to the matched object at 615. Returning to the Bluetooth headset example, if the matching 615 determines that the data received at 605 matches (or is similar to) a certain reference profile for a Bluetooth headset stored at 620, the second Bluetooth device 510 may then determine that the device making contact at the touch screen sensor is likely a Bluetooth headset, such as headset 505A. The matching may indeed determine a degree of similarity based on for example pattern recognition, statistical, or other techniques.

At 630, second Bluetooth device 510 may then initiate one or more operations based on the match found at 615, in accordance with some example embodiments. For example, second Bluetooth device 510 may have one or more rules associated with each match, and these rules may define what operations to perform given a certain match. To illustrate further, if the match found corresponds to a Bluetooth headset, the second Bluetooth device 510 may have one or more rules instructing the second Bluetooth device 510 to perform a Bluetooth inquiry to search for the Bluetooth headset 505A or to perform a direct connection setup to the identified headset. Matches of other objects may have different rules as well. For example, if the matched object corresponds to a finger, a hand, or stylus, other operations may instead be implemented.

Although some of the examples described herein refer to the object hovering above the touch screen sensor in the case of a capacitive touch screen sensor, the object may make contact with the touch screen sensor and other types of touch screen sensors may be used as well. Moreover, one or more aspects of process 600 may be performed with one or more other processes including for example aspects of process 900 and/or 1300 described below.

In some example embodiments, when making contact with the touch screen sensor, the signal caused by the capacitance change may be relatively strong, when compared to hovering. This contact gesture may also be used as a certain type of fingerprint stored at 620, and this fingerprint may have certain operations as well.

Given the wide variation in signal strength as noted above, the use of a single, signal strength threshold level may be problematic with respect to detecting discoverable devices in the vicinity of an inquiring device.

In some example embodiments, the subject matter disclosed herein may detect the orientation of an object and/or the position of the object in order to adjust a signal strength threshold value used to detect discoverable devices.

Referring again to FIG. 5, touch screen sensor 520 may be used to detect the orientation or the position of Bluetooth headset 505A. The orientation and/or position may be detected based on the detected touch profile/fingerprint of the Bluetooth headset 505A. Alternatively or additionally, an image sensor, such as a camera, may be as well to detect orientation and/or position. For example, the position of device 505A may be detected and the position relative to device 510/screen 520 may be determined.

In some example embodiments, the orientation and/or position information may be used to adjust, as noted, the signal strength threshold, such as an RSSI value, used to detect discoverable devices, such as Bluetooth headset 505A in the vicinity of tablet 510. As the signal strength emanated by Bluetooth headset 505A may vary based on at least the orientation and/or position of Bluetooth headset 505A (see, for example, infra and FIG. 4), the orientation and/or position information for the Bluetooth headset 505A may be detected by Bluetooth device 510 and then used to vary (for example, increase, decrease, or maintain) the signal strength threshold used to detect discoverable devices including Bluetooth headset 505A.

Figure 7:
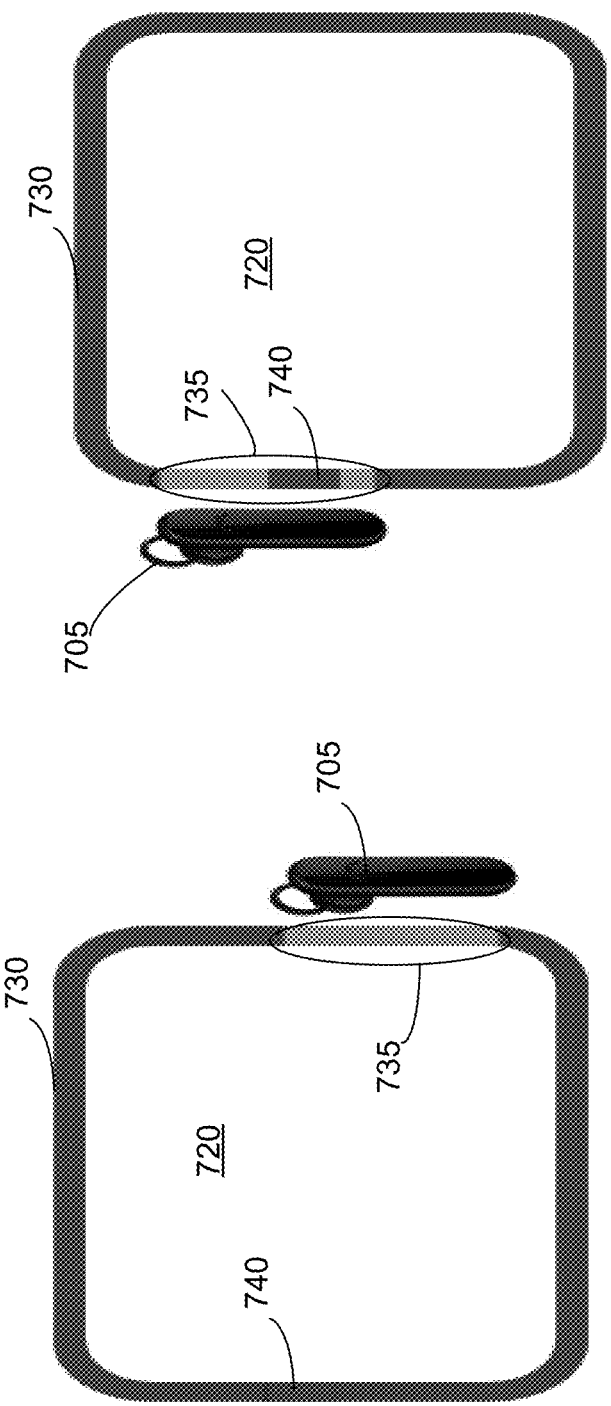
FIGS. 7A-7B depict examples of a first Bluetooth headset located at different locations near a touch screen sensor of a second Bluetooth device, in accordance with some example embodiments.

FIG. 7A depicts a first Bluetooth headset 705 located near a touch screen sensor 720 of a second Bluetooth device, such as a tablet 730 including antenna 740. The fingerprint of the first Bluetooth headset 705 may correspond to region 735.

FIG. 7B depicts the first Bluetooth headset 705 located near touch screen sensor 720 of a second Bluetooth device, such as a tablet 730 including antenna 740. However, FIG. 7B depicts the first Bluetooth headset 705 closer to the antenna 740, when compared to FIG. 7A. In the example of FIG. 7B when device 705 has a position in the vicinity of the antenna where the path loss estimate is the lowest, the signal strength threshold used to detect Bluetooth devices as part of discovery may be raised to a higher threshold. In this way, second device 730 may quickly detect headset device 705, and may ignore weaker signals from devices that are farther away. But when devices 705 has a position and/or orientation slightly farther way from the antenna as in the case of FIG. 7A where the path loss estimate is higher, the signal strength threshold used to detect Bluetooth devices as part of discovery may be lowered accordingly to a level expected from a device at position as depicted at for example FIG. 7A (or require for example more time for discovery to ensure there is not a lower RSSI value in the vicinity). In some example embodiments, the second Bluetooth device 730 may detect the object, which in this example is Bluetooth headset 705 and the position and orientation of Bluetooth headset 705. The second Bluetooth device 720 may then adjust the RSSI threshold level used to discover Bluetooth devices accordingly.

Figure 8:
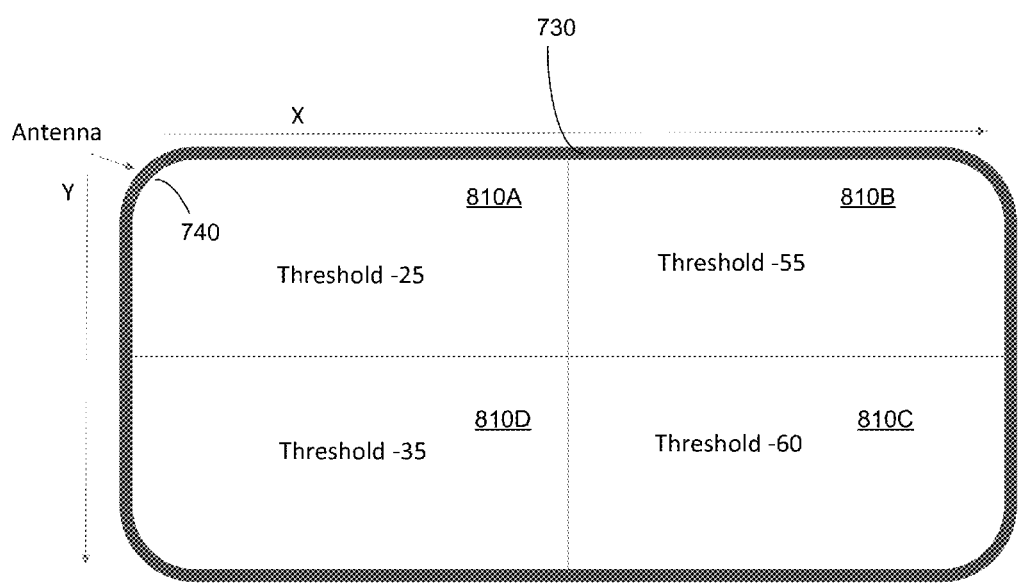
FIG. 8 depicts an example of mapping a detected location at the touch screen to a signal strength threshold value used to discover devices, in accordance with some example embodiments.

FIG. 8 depicts an example of mapping the detected location at the touch screen 730 to a signal strength threshold, such as the RSSI threshold value used to discover Bluetooth devices, in accordance with some example embodiments. In the example of FIG. 8, the touch screen sensor 720 is divided into for example four zones 810A-D. For example, if the position of Bluetooth headset 705 is detected in zone 810A (which is closest to antenna 740), the signal strength threshold (for example, RSSI) used to detect Bluetooth devices as part of discovery may be adjusted to a higher value, such as −25 dBm. However, if the position of Bluetooth headset 705 is detected in zone 810C (which is furthest from antenna 740), the signal strength threshold (for example, RSSI) used to detect Bluetooth devices as part of discovery may be adjusted to a lower value, such as −60 dBm. Although the previous example depicts four zones 810A-D and certain signal strength thresholds, other quantities of zones and/or thresholds may be used as well.

In some example embodiments, touch screen sensor 720 may be implemented as a capacitive 3D touch sensor, in which case the sensor may detect position/orientation of the object, such as Bluetooth headset 705, based on sensor data (which represents changes in the capacitive field) from the touch screen sensor 720. In the case of an image sensor at device 730, image processing may detect the object and location as well (for example, using a pattern matching technique to detect the object).

Although the previous example describes the location/orientation detection being performed with a matrix-based, capacitive 3D touch sensor, other sensors including image processing sensors may be used as well.

In some example embodiments, the RSSI threshold may be adjusted relative to the distance from the antenna to the detected location of the first device. This distance may thus be mapped directly to an RSSI adjustment, which may be used instead of the predefined areas depicted at FIG. 8.

Figure 9:
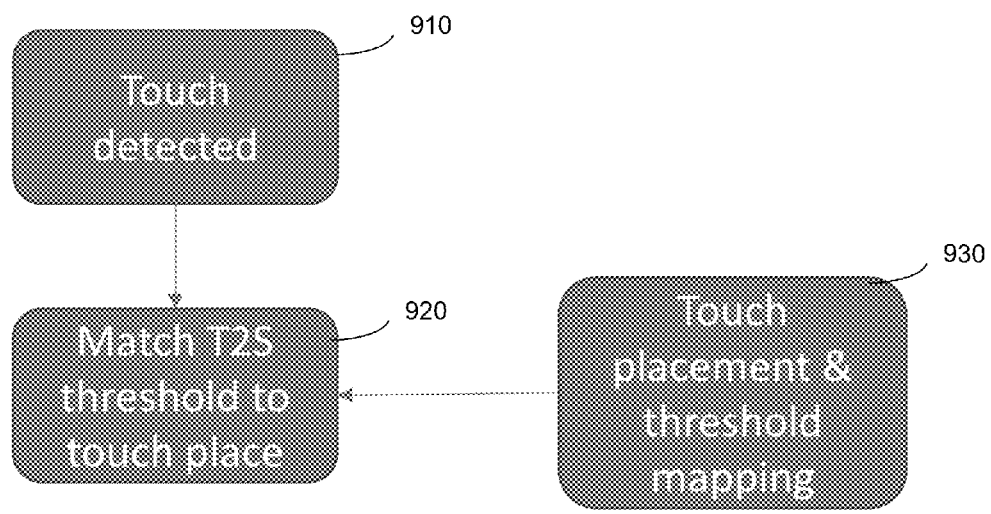
FIG. 9 depicts an example of a process for adjusting signal strength threshold values used for a device selection/discovery process, in accordance with some example embodiments.

FIG. 9 depicts an example process for adjusting signal strength threshold values used for selection process 900, in accordance with some example embodiments. The description of process 900 also refers to FIGS. 7 and 8.

At 910, a touch may be detected in accordance with some example embodiments. For example, touch screen sensor 720 may detect a touch (which may be a proximate touch that does not make actual contact with the touch screen sensor) corresponding to an object, such as Bluetooth headset 705. When this is the case, the touch screen sensor data for the touch (for example, the fingerprint/provide include coordinates of the touch, a touch identifier and the like) may be further processed to determine the location of the touch.

At 920, the location of the touch may be determined, in accordance with some example embodiments. For example, the location(s) of the touch detected at 910 may be mapped to a location on the touch screen 720, such as one of the locations 810A-D.

At 930, the determined location may then be mapped to a signal strength threshold, in accordance with some example embodiments. For example, if the detected location of the touch of Bluetooth headset 705 corresponds to location 810A (which is near the antenna 740), the threshold may be set at a higher value (for example, −25 dBm). But if the location corresponds to 810C, the signal strength threshold may be lowered to a lower value (for example, −60 dBm) to allow the weaker Bluetooth headset signal to be detected during discovery. The adjusted signal strength may then be used during device discovery. Specifically, the inquiring device may raise or lower the signal strength threshold used to select devices. For example, when Bluetooth headset 705 is detected and located near the antenna, the required signal strength to start connection setup may be higher when compared to when the headset 705 is located farther away from the antenna. As such, in situations in which the devices have low path loss, the connection process may made relatively quickly and reliably, whereas with higher path losses, the connection process may need more time in order to increase reliability due to low threshold.

Although some of the examples herein including the previous example provides example values for signal strength, these are only examples as other may be used as well. Moreover, one or more aspects of process 900 may be performed with one or more other processes including for example aspects of process 600 and/or 1300 described below.

In some example embodiments, a physical touch indication at a first Bluetooth device may be delivered to one or more peer Bluetooth devices to help the peer device perform detection and discovery of other devices.

In some example embodiments, a first Bluetooth device having a touch screen may detect an object's relative location and deliver that relative location information to other peer Bluetooth devices. For example, the first Bluetooth device having the touch screen may detect a second Bluetooth device, such as a Bluetooth headset or any other device. The first Bluetooth device may report this detected touch to other devices by sending one or more messages (for example, a device discovery message, a Bluetooth EIR response, or a Bluetooth Low Energy advertisement) reporting the touch. The first Bluetooth device may also add estimated path loss and/or a touch identification (for example, a touch length and/or an angle) information to the messages, such as the device discovery message and the like.

Path loss estimation may take into account attenuation caused by a hand or other object covering the antenna. Thus, a Bluetooth peer device may be able to make more sophisticated decisions regarding link attenuation and device identification. For example, if two tablets are placed next to each other, the two tablets may add to a Bluetooth Low Energy (BLE) advertisement, information about possible attenuation (which may be in addition to other information carried by the BLE advertisement including transmit power and the like). This attenuation information may enhance the link budget calculation performed by peer devices. Moreover, the BLE advertisement may include a measure of the detected touch, so that the connecting end may verify that the same length of vicinity touch is detected on both sides.

FIG. 10 depicts a first Bluetooth device 1010 (labeled Dev A) detecting a second device, such as Bluetooth headset 1015, and this detection may be occurring at a similar or same time as when Bluetooth devices 1020 and 1025 are performing a discovery and connection establishment. Using received information from device 1010, Bluetooth device 1025 may detect that it was Bluetooth device 1020, which made a close touch at the touch screen rather than device 1015.

In some example embodiments, the touch screen of device 1010 and/or 1025 may be a matrix-based, capacitive 3D touch sensor. The touch screen sensor may detect location of the accessory based on changes in nearby capacitive field.

Figure 11:
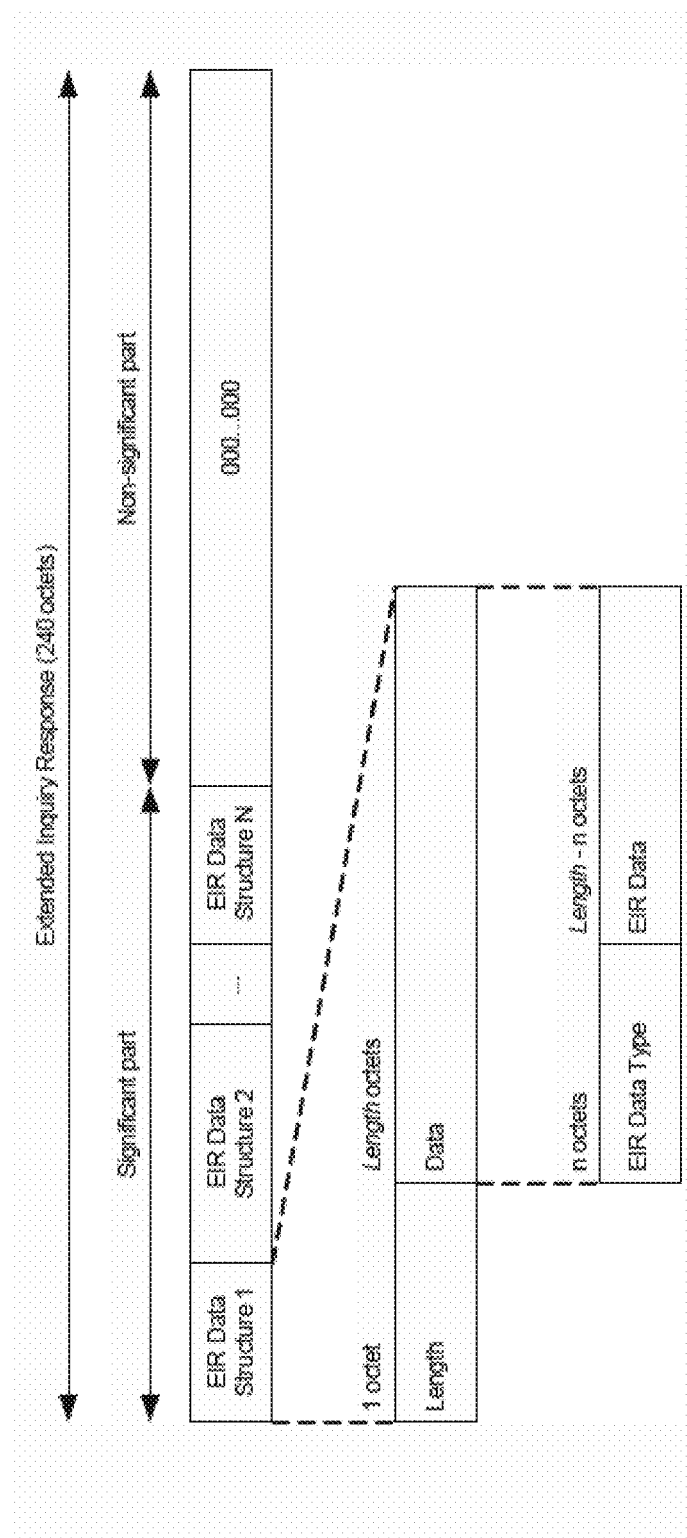
FIGS. 11-12 depict examples of messages which may carry the information related to the proximate devices, in accordance with some example embodiments.

To indicate a touch event, a motion sensor and/or a change the content of the EIR response packet may be used. FIG. 11 depicts an example of an EIR packet. The EIR packet may indicate a touch event using for example a universally unique identifier (UUID), wherein the two last bytes are estimated radiated power by for example device 1015 at the touch point, an example of which is as follows:
EIR Data type EIR data (Touch Indication)
0x07 06337a60-d280-11e2-8b8b-0800200c9a66

Figure 12:
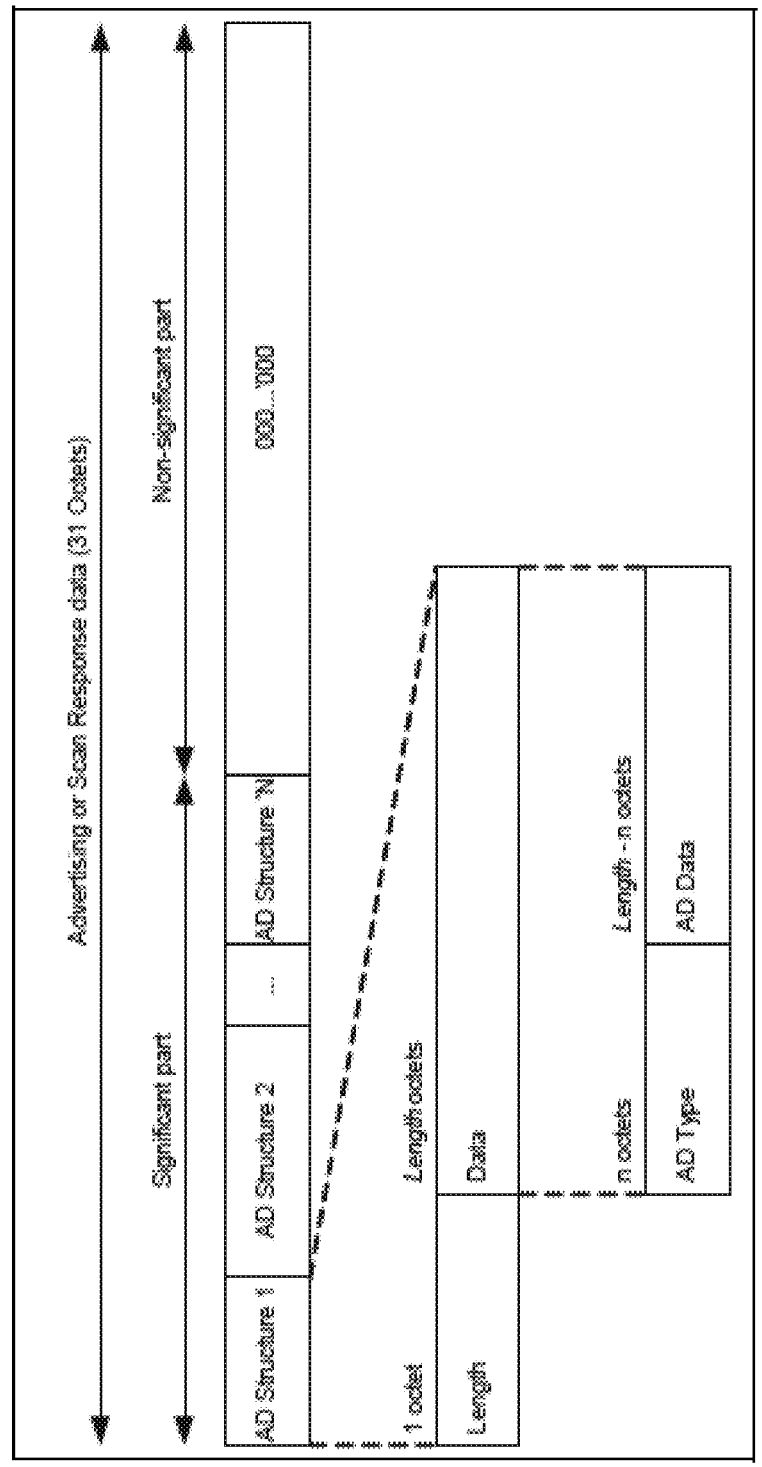

FIG. 12 depicts an example format of advertising data and scan Response data. This data may consist of a significant part and a non-significant part. The significant part may contain a sequence of Advertising Data (AD) structures.

Each AD structure may have a length field of one octet, which may contain the length value, and a data field of length octets. The first octet of the Data field may contain the AD type field. The content of the remaining length minus 1 octet in the data field may depend on the value of the AD type field, which may be referred to as AD data. The non-significant part may extend the Advertising and Scan Response data to 31 octets and may contain all-zero octets. Only the significant part of the Advertising or Scan Response data may need to be sent over the air. The Advertising and Scan Response data may be sent in advertising events. The Advertising Data may be placed in the AdvData field of ADV_IND, ADV_NONCONN_IND and ADV_SCAN_IND packets. The Scan Response data may be sent in the ScanRspData field of SCAN_RSP packets, in accordance with for example the Bluetooth specification, version 4.0 as well as any revisions or subsequent additions thereto.

In some example embodiments, the following format may be used to report the touch, radiated power, and touch point length, distance, and angle:
AD type=Vicinity detection;
AD Data (1 octet)=Estimated radiated power at touch point; and
AD Data (1 octet)=Estimated touch point length, distance and angle.

Touch point length may represent a distance between an antenna (for example, antenna 740) and touch point position calculated with for example x, y coordinates (for example, with length being same as distance). Angle represents an angle relative to the x-axis coordinate.

Figure 13:
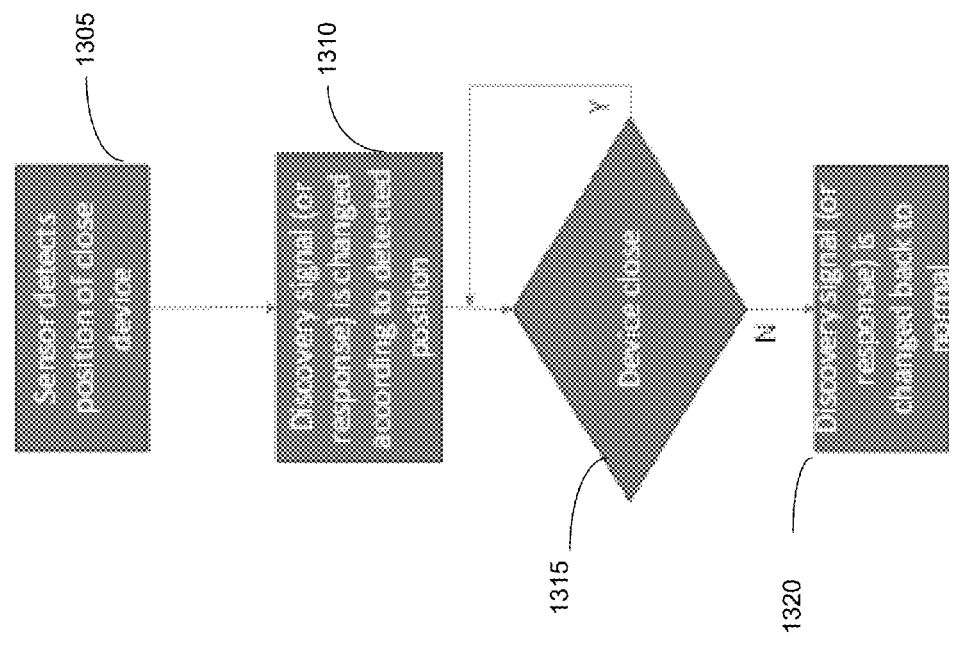
FIG. 13 depicts an example of a process in which at least one device communicates or advertises proximate devices, in accordance with some example embodiments.

FIG. 13 depicts a process 1300 for providing touch information to peers, in accordance with some example embodiments. The description of process 1300 also refers to FIG. 10.

At 1305, a touch screen sensor of a first Bluetooth device 1010 may detect a position of an adjacent Bluetooth device 1015, in accordance with some example embodiments. For example, the capacitive touch screen sensor of Bluetooth device 1010 may detect an adjacent Bluetooth device 1015, which is hovering, making contact with, and/or even outside of the periphery of the touch screen sensor display region.

At 1310, Bluetooth device 1010 may change a message sent to one or more peer device, in accordance with some example embodiments. For example, Bluetooth device 1010 may send a discovery signal, such as an EIR or BLE advertisement, to one or more peer devices, such as device 1025, 1020, and the like, indicating the detection of a nearby device Bluetooth device 1015. Moreover, this discovery message may include other information as well including measured signal strength, detected device identifiers, touch point length, distance and angle, radiated power at touch point, and any other information regarding the detected device.

The peer device may then use this information to make discovery and connection establishment decisions. For example, if in the device discovery, more than one device is found, the peer device may use information received from other device to solve which of the devices is sending information that can be matched to its own sensing information, such as RSSI, touch point length and/or angle. In some example embodiments, the message(s) sent at 1310 may be sent one or more times while (yes at 1315) the detected device 1015 is still near device 1010. When the detected Bluetooth device 1015 is no longer nearby or detected (no at 1315), the discovery signal, such as an EIR or BLE advertisement, sent by device 1010 may be again changed to remove information about device 1015 added at 1310.

Moreover, one or more aspects of process 1300 may be performed with one or more other processes including for example aspects of process 600 and/or 900 described below.

Figure 14:
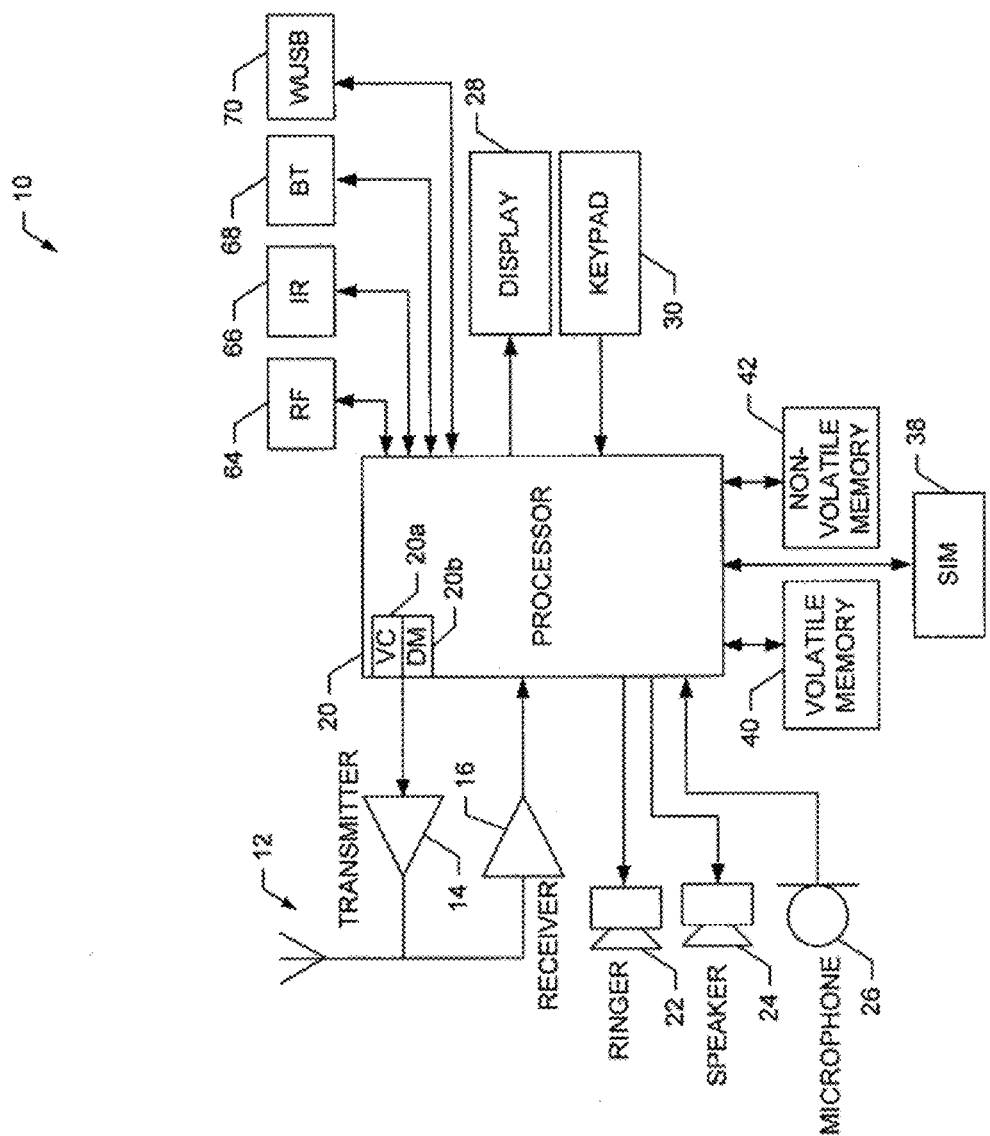
FIG. 14 depicts an example of a user equipment, in accordance with some example embodiments.

FIG. 14 illustrates a block diagram of an apparatus 10, in accordance with some example embodiments. For example, apparatus 10 may comprise a user equipment, such as a smart phone, a smart object, a mobile station, a mobile unit, a subscriber station, a wireless terminal, a tablet, a wireless plug-in accessory, a wireless sensor, a headset, or any other wireless device. The apparatus 10 may correspond to for example the Bluetooth device having the touch screen sensor and/or a Bluetooth device being detected by the touch screen sensor.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 14 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 14, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed with respect to process 600, 900, 1300, and the like including reading/receiving fingerprints, matching the fingerprints to stored finger prints, initiating certain operations based on the matching, determining orientation/position, adjusting threshold values, sending information/advertisements regarding a contact/touch, and/or performing inquiry scans. The memories may comprise an identifier, such as an international mobile equipment identification (IMEI) code, capable of uniquely identifying apparatus 10. In the example embodiment, the processor 20 may be configured using computer code stored at memory 40 and/or 42 to operations disclosed herein with respect to process 600, 900, 1300 and the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 14, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is increased selection probability and reliability of connection establishment.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

What is claimed is:

1. A method comprising:
   detecting, at a first device including a touch screen sensor and a first short-range transceiver, an object proximate to the touch screen sensor, the detection performed at least in part via the touch screen sensor;
   generating, based on information received via the touch screen sensor, a touch profile representative of the detected object;
   comparing the generated touch profile to one or more reference touch profiles representative of one or more reference objects corresponding to one or more devices to determine whether the detected object corresponds to at least a second device that includes a second short-range transceiver;
   adjusting, in response to the comparing indicates that the detected object matches a reference object representative of the second device, a received signal strength threshold for connection initiation, the adjustment of the received signal strength threshold based at least on the detected object being located in a first portion of the touch screen sensor, the received signal strength threshold being adjusted to a first value associated with the first portion of the touch screen sensor, the first value being different from a second value associated with a second portion of the touch screen sensor, and the second portion of the touch screen sensor being at a different distance from the first short-range transceiver than the first portion of the touch screen sensor; and initiating, by the first device and via the first short-range transceiver, a connection establishment to the second device including the second short-range transceiver, in response to a signal strength of a signal received from the detected object exceeding the adjusted received signal strength threshold.

2. The method of claim 1, wherein the touch screen sensor comprises a capacitive touch screen sensor.

3. The method of claim 1, wherein the first and second short-range transceivers each comprise a transceiver configured in accordance with at least one of Bluetooth, Bluetooth Low Energy, and ZigBee.

4. The method of claim 1, wherein the detecting further comprises determining the position and/or the orientation of the detected object with respect to the touch screen sensor.

5. The method of claim 1, wherein the connection establishment further comprises:
sending, by the first device via the first short-range transceiver, one or more messages to one or more devices including the second device, wherein the one or more messages include at least one of a page message or an inquiry message.

6. The method of claim 1, wherein the detecting further comprises:
detecting the object making contact with the touch screen sensor.

7. The method of claim 1, further comprising:
sending, by the first device, one or more messages to one or more peer devices, the one or more messages including information regarding the detected object.

8. The method of claim 1, wherein the position and/or orientation of the detected object comprises a location of the detected object on the touch screen sensor.

9. The method of claim 8, wherein the received signal strength threshold is adjusted to the second value based at least on the detected object being located in the second portion of the touch screen sensor.

10. The method of claim 9, wherein the first value is higher than the second value based at least on the first portion of the touch screen sensor being closer to the first short-range transceiver than the second portion of the touch screen sensor.

11. An apparatus, comprising:
at least one processor; and
at least one memory including computer program code, the at least one memory and the computer program code configured to, with the at least one processor, cause the apparatus to perform at least the following:
detect, at the apparatus an object proximate to a touch screen sensor, the detection performed at least in part via the touch screen sensor;
generate, based on information received via the touch screen sensor, a touch profile representative of the detected object;
compare the generated touch profile to one or more reference touch profiles representative of one or more reference objects corresponding to one or more apparatuses to determine whether the detected object corresponds to at least another apparatus that includes a second short-range transceiver;
adjust, in response to the comparing indicates that the detected object matches a reference object representative of the second device, a received signal strength threshold for connection initiation, the adjustment of the received signal strength threshold based at least on the detected object being located in a first portion of the touch screen sensor, the received signal strength threshold being adjusted to a first value associated with the first portion of the touch screen sensor, the first value being different from a second value associated with a second portion of the touch screen sensor, and the second portion of the touch screen sensor being at a different distance from the first short-range transceiver than the first portion of the touch screen sensor; and
initiate, by the apparatus and via a first short-range transceiver, a connection establishment to the second device including the second short-range transceiver, in response to a strength of a signal received from the detected object exceeding the adjusted receive signal strength threshold.

12. The apparatus of claim 11, wherein the touch screen sensor comprises a capacitive touch screen sensor.

13. The apparatus of claim 11, wherein the first and second short-range transceivers each comprise a transceiver configured in accordance with at least one of Bluetooth, Bluetooth Low Energy, and ZigBee.

14. The apparatus of claim 11, wherein the apparatus is further caused to at least determine the position and/or the orientation of the detected object with respect to the touch screen sensor.

15. The apparatus of claim 11, wherein the apparatus is further caused to at least send, via the first short-range transceiver, one or more messages to the other apparatus, wherein the one or more messages include at least one of a page message or an inquiry message.

16. The apparatus of claim 11, wherein the apparatus is further caused to at least, detect the object making contact with the touch screen sensor.

17. The apparatus of claim 11, wherein the apparatus is further caused to at least send one or more messages to one or more peer devices, the one or more messages including information regarding the detected object.

18. A non-transitory computer-readable storage medium including computer program code which when executed by at least one processor causes operations comprising:
detecting, at a first device including a touch screen sensor and a first short-range transceiver, an object proximate to the touch screen sensor, wherein the detection is performed at least in part via the touch screen sensor;
generating, based on information received via the touch screen, a touch profile representative of the detected object;
comparing the generated touch profile to one or more reference touch profiles representative of one or more reference objects corresponding to one or more devices to determine whether the detected object corresponds to at least a second device that includes a second short-range transceiver;
adjusting, in response to the comparing indicates that the detected object matches a reference object representative of the second device, a received signal strength threshold for connection initiation, the adjustment of the received signal strength threshold based at least on the detected object being located in a first portion of the touch screen sensor, the received signal strength threshold being adjusted to a first value associated with the first portion of the touch screen sensor, the first value being different from a second value associated with a second portion of the touch screen sensor, and the second portion of the touch screen sensor being at a different distance from the first short-range transceiver than the first portion of the touch screen sensor; and initiating, by the first device via the first short-range transceiver, a connection establishment to the second device including the second short-range transceiver, in response to a strength of a signal received from the detected object exceeding the adjusted received signal strength threshold.

19. The non-transitory computer-readable storage medium of claim 18, wherein the detecting further comprises determining the position and/or the orientation of the detected object with respect to the touch screen sensor.

20. The non-transitory computer-readable storage medium of claim 18, which when executed by at least one processor causes further operation of detecting the object making contact with the touch screen sensor.

* * * * *